J. & J. C. BLAIR.
HARVESTERS.
No. 195,084. Patented Sept. 11, 1877.
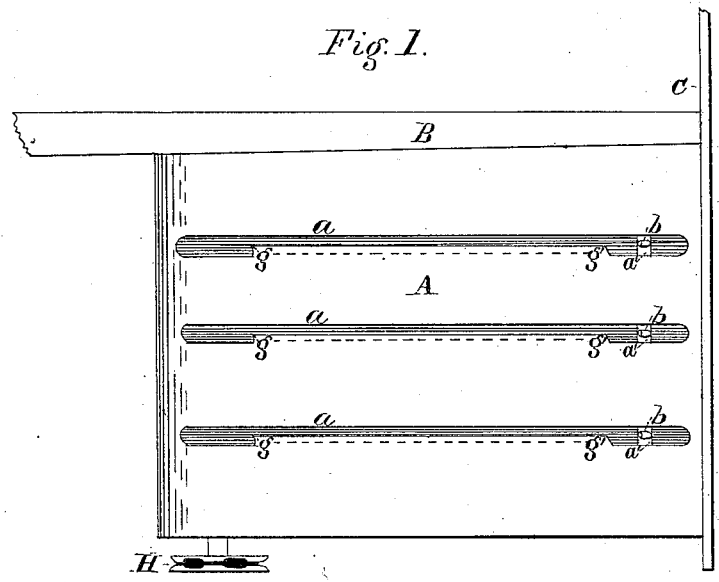
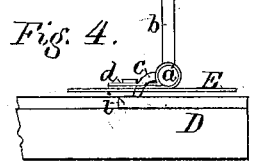
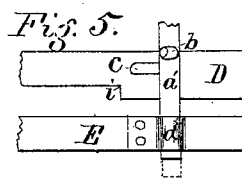
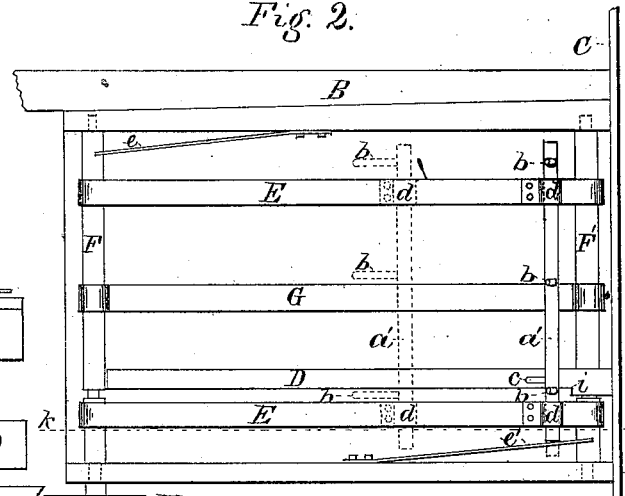
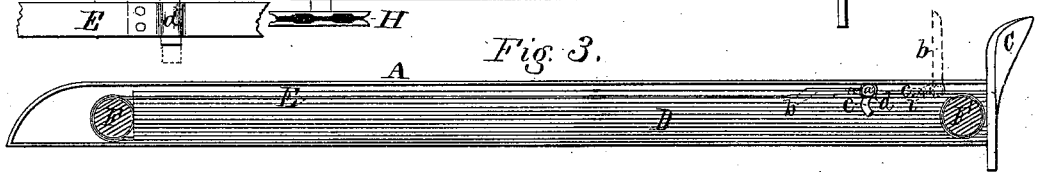
Attest:
M. M. Converse
J. T. Morrison
Inventors.
John Blair
James C. Blair
B. C. Converse, Atty.

UNITED STATES PATENT OFFICE.

JOHN BLAIR AND JAMES C. BLAIR, OF MADISON COUNTY, OHIO.

IMPROVEMENT IN HARVESTERS.

Specification forming part of Letters Patent No. 195,084, dated September 11, 1877; application filed May 18, 1876.

*To all whom it may concern:*

Be it known that we, JOHN BLAIR and JAMES C. BLAIR, of the county of Madison and State of Ohio, have jointly invented certain Improvements in Harvester-Rakes, of which the following is a specification:

Our invention relates to that class of rakes for harvesters which operate below the platform, the teeth only projecting above it for raking off the gavel of grain.

The platform of the harvester to which our rake is adapted is a straight one, the rake moving in a line parallel with the cutter-bar. It is provided with long slots for the movements of the rake-teeth across it. At each end these slots are widened to allow of a side movement of the rake when the teeth appear above and disappear below the platform. The inner end of the platform is curved downward to facilitate the discharge of the gavel of grain. The top platform may be made wholly or in part of sheet metal.

The entire actuating mechanism is under the platform. It consists of two rollers, one at the grain end and the other at the end next the machine, which carry three steel half-belts—two above, which support and carry back and forth the rake attached to them, and one below, for rendering the connection complete and giving steadiness and strength to the movement. The rake does not pass around the rollers, but after discharging the gavel it passes back in the same plane, being reciprocating in its movements.

The object of the invention is to produce an effective working rake which shall be simple in construction, certain in its operation, and which can have its actuating mechanism compressed into a space thin enough not to interfere at all with the operation of the harvester in lowering the cutter-bar; also, to leave a clear platform for the falling grain while the rake is moving back to the grain-board; also, by an automatic movement, which shifts the rake endwise, to bring its foot upon a guideway at the same time that it elevates the teeth at the point of beginning at the grain end of the platform, and to throw it off after each discharge at the same time that the teeth are depressed to pass backward at the opposite end. The top of the guideway and the under side of the platform form the upper and lower supports for the rake-foot as the rake pushes the grain.

Figure 1 is a plan view of a harvester-platform with our improved self-rake. Fig. 2 is a plan view of the same, with the platform removed, showing the rake and its actuating mechanism. Fig. 3 is a longitudinal section through the dotted line $k$, Fig. 2, enlarged. Fig. 4 is an enlarged sectional view of the rake and its attachments, also a sectional view of the tripping end of the guide-piece or bridge-tree in elevation. Fig. 5 is a plan view of the same.

A is the platform, which is straight, is constructed of sheet metal, and is slotted from end to end by the slots $a\ a\ a$, through which the teeth of rake $a'$ project when elevated, and along which they travel in pushing off the grain. These slots are enlarged at their ends to twice their width (on the rear side) to allow the teeth $b\ b\ b$ to rise and lower at the instant of their being shifted into the line of the main slot to operate, and out of it to pass back under the platform. B is the cutter-bar, to the rear edge of which the platform A is attached. The frame of the platform consists, simply, of a front and rear rail connected at the outer end by the grain-board C. The bottom of the platform is also of sheet metal. Both bottom and top may be strengthened, if required, by strips of metal. D is the guideway extending from roller F to grain-board C, between G and the rear half-belt E. C is the rake-foot or tripper. It is made round, and extends out at nearly a right angle (if straight) to the teeth $b\ b\ b$. It is, however, curved slightly downward to facilitate the performance of its several functions. E E are the upper half-belts, to which the rake $a'$ is fastened by the loops or loop-boxes $d\ d$. These latter are loose enough to allow the rake $a'$ to slide through them easily in shifting. These loops are made of the same or of thicker material than the belts, and riveted upon the top of them. (See Figs. 2, 4, and 5.)

The belts E E are made of thin ribbon-steel, similar to clock-springs. They extend over the top of the rollers F F', (which are journaled in the front and rear rails,) having their ends wound around and fastened to them.

Another half-belt, G, of the same construction, extends under the rollers about the middle of the platform, and has its ends wound upon the rollers in the same manner, but in the opposite direction.

Roller F extends beyond the rear rail, and has a drive-wheel on it.

An ordinary clutch can be used for throwing the mechanism of the rake in and out of gear at the end of each movement.

In the operation of the rake the belts simply wind up and unwind upon each roller alternately, to produce the reciprocating movement.

Certain other accessory parts, which produce the automatic shifting movement of the rake, made to pass the rake back under the platform after each discharge, and to elevate its teeth, may be seen by reference to Figs. 2, 3, 4, and 5.

At the beginning of each movement, with the rake at the outer or grain end of the platform and its teeth elevated, its foot-piece $c$ rests on the top of the guideway or bridge-tree D, and as it passes between it and the under side of the platform, it steadies the rake and holds its teeth in an upright position. On turning roller F to the left by its drive-pulley H, the rake is drawn along to the inner or left end of the platform, its foot sliding on the guideway D until it arrives at $g$, when it is suddenly shifted to the rear, the teeth $b$ falling into the enlarged slot at this end by the action of the spring $e$, Fig. 2, which pushes the foot or tripper $c$ off the guide-piece D, causing the teeth of the rake to fall forward, thus facilitating the discharge of the gavel. At this point the reverse motion takes place, and the rake is carried again to the outer end of the platform along the dotted lines $c'$. (See Fig. 1.) When it arrives at this end at the enlarged slot $g'$, its teeth are in a horizontal position until its tripper reaches the subtended angle $i$ of the guide-piece or bridge-tree D, where it is again thrown up, elevating the rake-teeth in the slot $g'$, and the pressure of spring $e'$ shifts the rake forward toward the cutter-bar, throwing the tripper or foot $c$ on the top of D, as shown in Figs. 2, 4, and 5, and in dotted lines, Fig. 3, when its movement to the left is again resumed.

The boxes for the journals of F F' may be made adjustable by screws, to keep the metal half-belts E E and G strained to the required tension.

The rollers F F' need not be more than two and a half to three inches in diameter, or even less, thereby giving but little depth to the platform.

The operation of our rake is such as not to require the dividing-rod, as all grain falling behind the rake is removed from the platform by its next movement.

A cross-bar of iron can be used at the discharge end of the platform to rivet the ends of the top and bottom sheets to, for greater strength at this part. The frame of the platform can also be constructed of thin, light angle-iron, if desired.

In constructing it as specified, an end rail next the machine may be dispensed with, sufficient strength for the operation of the rake mechanism being all that is required. This latter is comparatively noiseless, and can be operated so as to produce but little vibration or shock in its reverse movements.

The platform is essentially a hollow one, with the rake movements within it, as their protection from contact with stubble or uneven ground requires an entire bottom sheet of metal.

Disclaiming the use of endless belts or chains in operating a self-rake,

We claim as our improvement—

1. The combination, in a harvester-rake, of the platform A, having slots $a$, enlarged at both ends $g$ $g'$, the rake-head $a'$, its rigidly-attached teeth $b$ and foot $c$, and devices for imparting to the said rake, first, a traversing motion back and forth beneath the slotted plate; second, a longitudinal motion to carry the teeth into the enlarged slots; and, thirdly, the bridge D and its shoulder giving a positive rock motion to throw the teeth down and up, all as herein set forth.

2. The combination of the plate A, its slots with enlarged ends $g$ $g'$, the rake $a'$, its teeth and foot $c$, the springs $e$ $e'$, and the bridge D with its shoulder $i$, all constructed and operating as herein specified.

3. The reciprocating metallic belts combined with metal boxes and with a rake-head, the shaft of which turns and slides in said boxes, as specified.

JOHN BLAIR.
JAMES C. BLAIR.

Attest:
  MARY A. BLAIR,
  JACOB MCNEAL.